Aug. 12, 1969  R. A. LONG ET AL  3,460,920
FILAMENT REINFORCED METAL COMPOSITES FOR GAS TURBINE BLADES
Filed Oct. 10, 1966
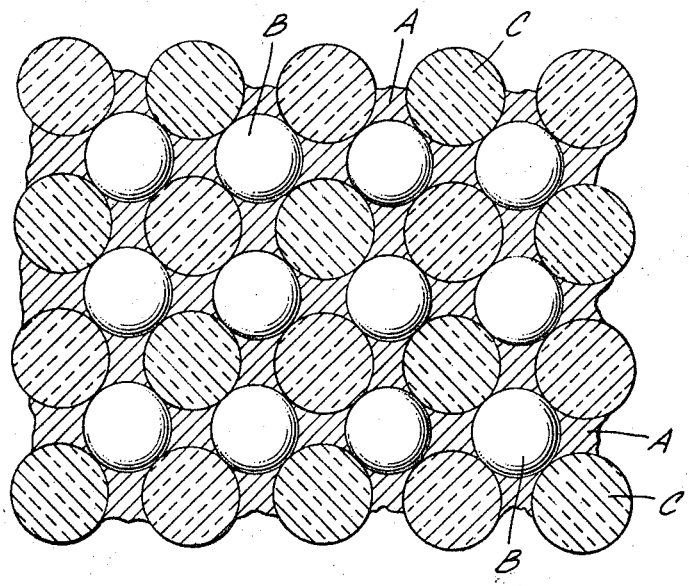
ROGER A. LONG
RODNEY A. JONES
INVENTORS.
BY
ATTORNEYS

United States Patent Office 3,460,920
Patented Aug. 12, 1969

3,460,920
FILAMENT REINFORCED METAL COMPOSITES FOR GAS TURBINE BLADES
Roger A. Long, Escondido, and Rodney A. Jones, San Diego, Calif., assignors to Whittaker Corporation, Los Angeles, Calif., a corporation of California
Filed Oct. 10, 1966, Ser. No. 585,379
Int. Cl. B21h 7/16
U.S. Cl. 29—183.5    13 Claims

ABSTRACT OF THE DISCLOSURE

This patent describes a novel filament reinforced composite comprising a platinum metal group matrix phase, a dispersed hard particle phase and a reinforcing fiber phase, said composite having oxidation resistance and strength maintenance to at least 2400° F.

---

This invention relates to a novel composite material capable of withstanding temperatures on the order of 2000 to 2400° F. which is particularly useful in operational turbojet turbine buckets.

In modern flight vehicles utilizing chemical and nuclear power plants, the allowable operating temperatures of various components of such structures must be increased in order to improve efficiency. For this reason, future turbine engines must have increased allowable turbine inlet temperatures. In order to meet the operating temperature requirements of such power plants, particularly for turbine buckets, the materials of construction must be capable of withstanding operating temperatures up to about 2400° F. This means that the material must be capable of maintaining strength, oxidation resistance and high overall modulus at these temperatures. Progress in improving the high-temperature strength of conventional heat-resistant alloys has reached the point of diminishing returns, and refractory metals such as tungsten and molybdenum are plagued with a high specific gravity and poor oxidation resistance. Ceramic materials overcome these problems, but present equally serious drawbacks due to brittleness, marginal strength, and poor thermal shock resistance. Considerable effort was devoted to mixtures of ceramics and metals (cermets) with the idea that such composites could be developed having a maximum of the desirable features of each component and a minimum of the undesirable ones. Many interesting new materials were developed, but the desired objective of high strength *and* sufficient ductility was never fully realized. These requirements also preclude the use of either glass or refractory metal fibers. In addition, these requirements eliminate from consideration nickel base, cobalt base alloys, and refractory alloys. Thus, the present invention is primarily concerned with the provision of novel materials suitable for use at high temperatures, particularly in engine turbine buckets.

It is, therefore, a principal object of the present invention to provide a novel composite material capable of withstanding 2000° to 2400° F. temperatures, particularly useful in operational turbine buckets.

Yet another object of the present invention is to provide an improved material combining high modulus, high-temperature oxidation resistance and good strength at elevated temperatures.

Still another object of the present invention is to utilize a novel fiber-reinforced composite material suitable for use at temperatures up to 2400° F.

Another object of the present invention is the provision for a material maintaining a moderately thick, oxidation-resistant metallic film between the unidirectional refractory fibers.

In another aspect the present invention is concerned with developing the processing methods for the incorporation of fibers and fiber-spacing hard particle phases into a metal matrix composite structure without sacrificing the high-strength high-modulus properties of the reinforcing fiber.

These and other objects and advantages of the present invention will become apparent from the more detailed description which follows.

Briefly, the metal composite for the present invention utilizes a minimum of three separate metallurgical components. These three components are generally a metal matrix phase, a dispersed hard phase and a reinforcing fiber phase. The idealized arrangement of these components is shown in the cross-sectional view of the drawing in which the matrix phase is A, the dispersed hard phase is B, and the reinforcing fiber is C.

The reinforcing fiber phase is the major load-carrying component and the filaments are preferably oriented in the case of turbine buckets in an axial direction. In order to fulfill their purpose in this invention, the fibers are generally characterized by the following properties: (1) oxidation resistance to at least 2400° F. for time periods in excess of 200 hours; (2) low density; (3) high ultimate tensile strength and strength maintenance to at least 2400° F; (4) high elastic modulus and maintenance of a modulus greater at all use temperatures than the modulus of the adjoining metal matrix phase; (5) chemical and metallurgical compatibility with the metal matrix phase during processing as well as during use at contemplated operating temperatures and times; and (6) erosion resistance to hot gas combustion products.

The dispersed hard particle phase serves primarily as a low-density filler and fiber spacer material by occupying a portion of the interfiber volume thus decreasing the volume required of matrix alloy and decreasing the density of the composite. In addition, the dispersed hard particle phase maintains the proper spacing of the reinforcing fibers and is necessary to control the metal matrix film thickness. This hard particle phase can also be in the form of a filament overwound on the reinforcing fiber and of smaller diameter. To fulfill these functions efficiently, this phase should meet the following requirements: (1) low density; (2) controllable diametrical particle size; (3) oxidation resistance up to at least 2400° F.; (4) erosion resistance to hot gas combustion products; (5) low ductility and high creep resistance up to at least 2400° F.; (6) high individual particle shear strength operating temperatures; (7) high individual particle or filament compressive strength at operating temperatures; (8) high thermal diffusivity; and (9) compatibility of being wetted and chemically bonded by the metal matrix phase.

The metal matrix phase serves to join together the reinforcing fiber phase and the dispersed hard particle phase. In general, the metal matrix phase should have the following properties: (1) oxidation resistance to at least 2400° F. for a minimum of 200 hours; (2) an elastic modulus less than that of the reinforcing fiber phase at all contemplated operating temperatures; (3) capability of developing a high interfacial shear strength with both the dispersed phase and the reinforcing fiber phase, as well as having high internal shear strength; (4) chemical and metallurgical compatibility with the other material phases at processing and operating temperatures; (5) plasticity at all temperatures sufficient to locally transfer stress caused by structural and/or thermally imposed loads; (6) low density; (7) high creep resistance at operating temperatures; (8) high stress-to-rupture strength at operating temperatures; (9) capability of being further strengthened by dispersion of hard particles; and (10) erosion resistance to hot gas combustion products.

As has been indicated, the three structural phases must be capable of meeting the requirements of inherent oxidation resistance at 2400° F. For this reason the reinforcing fiber phase is generally a high melting carbide, metal oxide, refractory metal disilicide, beryllide, nitride, or boride. The dispersed hard particle phase may be any of the materials mentioned above with regard to the reinforcing fiber phase, a refractory metal boride, or a protectively-coated (plated with iridium or vapor-plated with silicon carbide) spherical graphite particle or a fiber which can be wound over the reinforcing fiber phase. Preferably, the hard particles have the same chemical composition that is used for the reinforcement fiber, as this selection minimizes the major problems of chemical-metallurgical compatibility associated with the metal matrix phase. The form of this phase, however, can be different from the fiber phase—such as a spherical shape in order to properly maintain the fiber spacing so that optimum metal matrix thickness is achieved between the fibers. However, where spherical particles are not obtainable, a controlled size angular powder particle shape may be used, also this phase can be in the form of a filament which is spirally overwound on the reinforcing fiber phase and in this way acts as a spacer and filler. All such embodiments are intended to be included within the term "hard particle" as employed herein and in the claims. The metal matrix phase alloy is generally one of the platinum group noble alloys. Typical of such alloys are rhodium-platinum, rhodium-palladium, rhodium-iridium and rhodium-ruthenium or combinations thereof including other melting point metals such as chromium, molybdenum, tungsten, etc.

The preferred reinforcing fiber phase is silicon carbide. Silicon carbide is particularly useful because of its high strength at elevated temperatures, and its retention of strength with time at temperature. Pyrolytic-deposited silicon carbide on a tungsten wire or other inert material core can be made in a continuous monofilament form of large diameter (5 mil). Various types of $Al_2O_3$ whiskers are available as loose needles and mats with diameters of from 1 to 30 microns and length-to-diameter ratios of 10 to 5000. Large diameter monofilaments of alumina would be desirable but are currently not available in the sizes desired.

As has been indicated above, the dispersed hard particle phase must be oxidation resistant, have low density and good shear and compressive strength. Preferably the dispersed hard particle phase is of either a uniform spherical or filament configuration. Carbon and graphite have a low density, excellent high temperature strength and good thermal conductance. Therefore, carbon and/or graphite having a vapor-deposited carbide coating thereon to provide oxidation resistance in spherical form and/or in fiber form is one preferred type of hard particle phase. Other materials suitable as a dispersed hard particle phase include commercially available ceramics and particular hollow alumina metal coated spheres. These hollow ceramic spheres have a desirable low density of less than 1.2 g./cc. Metallic precoated ceramic spheres are also desirable provided the metal is compatible with the matrix metal or alloy.

The metal matrix phase is generally a platinum group alloy. Rhodium metal and alloys thereof are the preferred materials because of their high oxidation resistance and strength. According to the present invention the three phase composite material is made up of longitudinal load-carrying filaments plus a dispersed hard particle filler spacing phase bonded together with an infiltrated continuous metal matrix phase preferably by use of vacuum. Preferably the composite utilized is the silicon carbide filament bonded with a rhodium-based alloy in which a dispersed phase of either solid silicon carbide spherical particles or filaments is utilized to space adjacent longitudinal filaments in order to provide an optimum metal matrix thickness for strain transfer and mechanical impact considerations. A whisker dispersion hardening and/or precipitation hardening phase within the metal matrix may optionally be utilized in order to obtain lateral and shear strength enhancement. Theoretical properties of representative composites of the present invention are illustrated in Table 2, based on constituent properties indicated in Table 1.

TABLE 1.—ASSUMED FIBER/MATRIX PROPERTIES

|  | Density,[1] gm./cc. | Short time tensile strength, p.s.i. | | Elastic modulus×10[6] p.s.i. | |
| --- | --- | --- | --- | --- | --- |
|  |  | RT | 2,400° F. | RT | 2,400° F. |
| SiC fibers (4 mil. dia. with 0.5 mil W core) | 3.47 | 400,000 | 130,000 | 60 | 40 |
| Rhodium alloy | 12.4 | 100,000 | 6,000 | 45 | 5 |
| SiC spheres | 3.22 |  |  |  |  |

[1] Gm./cc.=lb./in.$^3$×27.7.

TABLE 2.—THEORETICAL COMPOSITE PROPERTIES

| | Composite | | | | |
| --- | --- | --- | --- | --- | --- |
| | #1 | #2 | #3 | #4 | #5 |
| SiC (fiber), volume percent | 70 | 50 | 50 | 70 | 40 |
| Rhodium alloy (matrix), volume percent | 30 | 30 | 40 | 20 | 50 |
| Dispersed phase (SiC), volume percent | 0 | 20 | 10 | 10 | 10 |
| Composite density, gm./cc. | 6.15 | 6.10 | 7.02 | 5.26 | 7.94 |
| Short time tensile strength of composite: | | | | | |
| RT, p.s.i. | 370,000 | 290,000 | 320,000 | 340,000 | 310,000 |
| 2,400° F., p.s.i. | 95,875 | 69,875 | 71,500 | 94,250 | 60,125 |
| Specific strength of composite: | | | | | |
| RT, in. | 1.67×10$^6$ | 1.31×10$^6$ | 1.45×10$^6$ | 1.79×10$^6$ | 1.08×10$^6$ |
| 2,400° F., in. | 0.43×10$^6$ | 0.31×10$^6$ | 0.32×10$^6$ | 0.50×10$^6$ | 0.21×10$^6$ |

In general, the matrix comprises about 20 to 50 volume percent of the total composite, however, approximately 30–40 volume percent would seem to be preferable from a density and a film thickness standpoint.

By way of comparison, it should be noted that a typical nickel base turbine blade alloy presently available has a short-term tensile strength of 104,000 p.s.i. at room temperature and 67,000 p.s.i. at 1700° F. Its higher density of approximately 8.6 g./cc. gives it a strength-to-density ratio of 0.34×10$^6$ in. at room temperature and 0.22×10$^6$ in. at 1700° F. which is comparable or lower at 1700° F. than the composite described herein at 2400° F.

Preferably, the composite of the present invention is characterized by uniform-size parallel fibers or filaments with dense cubic packing to provide about 22% void volume. If 3 mil diameter filaments are positioned 0.75 mil apart, or 4 mil diameter filaments are positioned 1 mil apart, the fiber-to-void ratio is approximately 50/50. With uniform spacing, spherical particles with a diameter three-fourths that of the parallel filament diameter will just fit in the void space between four adjacent parallel filaments.

The above method of forming a three-phase composite provides for adjusting the metal matrix film thickness to the optimum value for producing the desired degree of ductility without unduly increasing the specific gravity of the composite. A further reduction of void volume (and matrix) can be attained by addition of smaller diameter, hard-particle granules, short fibers and/or whiskers. A whisker addition of a few percent (e.g., 10%) in certain cases can greatly improve shear strength of the composite. Another modification of the invention is based on the finding that some filaments and particles have to be metallized or coated before incorporation. With the noble metal matrix, the precoating is of a heat-resistant alloy (chromium, cobalt or precious metal base). The precoating may be accomplished at the expense of either the filaments and hard particles or the noble metal matrix volume percent which ever is deemed advisable. The metal matrix can also be applied as a vapor-deposited precoating then the entire compacted by either a solid diffusion sintering process or in situ melting. While not bound by any theory, it is believed that the hard-particle filler provides additional aerodynamic smoothness and stiffness to the composite. The matrix metal and precoat functions to transfer shear between the fiber reinforcement and hard-particle filler segments. The longitudinal fiber reinforcement provides structural strength to the entire composite.

As will be apparent to those skilled in the art, the present invention provides a novel composite material possessing high temperature properties which are of significance to the turbine engine industry and in other stressed areas involving operating temperatures on the order of 2000° F. to 2400° F. The materials of this invention are also notable in that they are capable of being readily formed into various structural shapes.

Having fully described the invention, it is intended that it be limited only by the lawful scope of the appended claims.

We claim:
1. A novel filament reinforced composite comprising a platinum group metal matrix phase, a dispersed hard particle phase and a reinforcing fiber phase, said composite having oxidation resistance and strength maintenance to at least 2400° F.

2. A novel turbine blade comprising a platinum group metal matrix phase, a dispersed hard particle phase and a reinforcing longitudinal load-carrying fiber phase, said dispersed hard particle phase spacing said fibers, said turbine blade having oxidation resistance and strength maintenance to at least 2400° F.

3. A novel filament reinforced composite comprising a platinum group metal matrix phase having oxidation resistance to at least 2400° F. for a minimum of 200 hours, a dispersed hard particle phase having oxidation resistance up to at least 2400° F., and a reinforcing fiber phase having oxidation resistance up to at least 2400° F. and chemical and metallurgical compatibility with the metal matrix phase during processing as well as during use at contemplated operating temperatures and times.

4. The composite of claim 1 wherein the fiber phase is selected from the group consisting of high melting carbides, metal oxides, refractory metal disilicides, beryllides, nitrides and borides.

5. The composite of claim 1 wherein the hard particles and the fiber have the same chemical composition.

6. The composite of claim 1 wherein the hard particles are spherical in shape.

7. The composite of claim 1 wherein the hard particles are filamentary in shape.

8. The composite of claim 1 wherein the fibers have a diameter greater than 10 microns, and the hard particles are spheres having diameters about three-fourths that of the fiber.

9. The composite of claim 1 wherein the fibers have a diameter greater than 10 microns and the hard particles are filaments having a diameter about half that of the reinforcing fiber.

10. The composite of claim 1 wherein the matrix phase is a rhodium-containing alloy.

11. The composite of claim 1 wherein the fibers comprise silicon carbide.

12. The composite of claim 1 wherein the hard particles comprise silicon carbide.

13. The composite of claim 1 wherein the hard particles are filaments spirally overwound on said reinforcing fiber.

References Cited
UNITED STATES PATENTS

| | | | |
|---|---|---|---|
| 3,084,421 | 4/1963 | McDanels et al. | 29—183.5 |
| 3,098,723 | 7/1963 | Micks | 29—183.5 |
| 3,138,837 | 6/1964 | Weeton et al. | 29—194 X |
| 3,282,658 | 11/1966 | Wainer | 29—183.5 |
| 3,303,006 | 2/1967 | Morley et al. | 29—194 |
| 3,352,650 | 11/1967 | Goldstein et al. | 29—191 |

FOREIGN PATENTS
733,061  7/1955  Great Britain.

L. DEWAYNE RUTLEDGE, Primary Examiner

E. L. WEISE, Assistant Examiner

U.S. Cl. X.R.

29—191